US012794397B2

(12) United States Patent
Kim et al.

(10) Patent No.: US 12,794,397 B2
(45) Date of Patent: Nov. 10, 2026

(54) SYSTEM FOR ESTIMATING TEMPERATURE OF PERMANENT MAGNET OF ROTOR OF MOTOR

(71) Applicant: HYUNDAI MOBIS CO., LTD., Seoul (KR)

(72) Inventors: Sang Min Kim, Seoul (KR); Jin Qyu Seo, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 245 days.

(21) Appl. No.: 18/650,685

(22) Filed: Apr. 30, 2024

(65) Prior Publication Data

US 2024/0388238 A1 Nov. 21, 2024

(30) Foreign Application Priority Data

May 19, 2023 (KR) ........................ 10-2023-0065204

(51) Int. Cl.
*H02P 29/66* (2016.01)

(52) U.S. Cl.
CPC .................................. *H02P 29/662* (2016.11)

(58) Field of Classification Search
CPC ..................................................... H02P 29/662
See application file for complete search history.

(56) References Cited

U.S. PATENT DOCUMENTS

2014/0354204 A1* 12/2014 Tachibana ................. H02P 6/10 318/473
2020/0313586 A1* 10/2020 Gopalakrishnan ...... B60L 50/60

FOREIGN PATENT DOCUMENTS

JP 2006-254521 A 9/2006
JP 2022-182027 A 12/2022

OTHER PUBLICATIONS

Extended European search report issued on Oct. 4, 2024, in counterpart European Patent Application No. 24173974.7 (7 pages).

* cited by examiner

*Primary Examiner* — Zoheb S Imtiaz
(74) *Attorney, Agent, or Firm* — NSIP Law

(57) ABSTRACT

A system for estimating a temperature of a permanent magnet of a rotor of a motor including a first determination unit configured to determine whether a rotational speed of the rotor is greater than or equal to a reference speed, a second determination unit configured to determine whether a current flowing in a coil included in the motor is less than a reference current, and whether a magnitude of q-axis energy of the motor is less than a reference energy magnitude, when the rotational speed is greater than or equal to the reference speed, a magnetic flux map temperature estimation unit configured to estimate the temperature of the permanent magnet using a d-axis magnetic flux map of the motor responsive to conditions being satisfied, and an energy map temperature estimation unit configured to estimate the temperature responsive to conditions not being satisfied in the second determination unit.

20 Claims, 7 Drawing Sheets

SYSTEM FOR ESTIMATING TEMPERATURE OF PERMANENT MAGNET OF ROTOR OF MOTOR

CROSS REFERENCE TO RELATED APPLICATION

The present application claims the benefit under 35 USC § 119(a) of Korean Patent Application No. 10-2023-0065204, filed May 19, 2023, the entire disclosure of which is incorporated herein by reference for all purposes.

BACKGROUND OF THE INVENTION

1. Field

The present invention relates to a system for estimating a temperature of a permanent magnet of a rotor of a motor, and more specifically, to a system for estimating a temperature of a permanent magnet of a rotor for a motor, which may monitor the temperature of the permanent magnet attached to the rotor of the motor in real time.

2. Description of the Related Art

In a motor, since the magnetic characteristics of a permanent magnet included in the motor change depending on a temperature, it is necessary to estimate a temperature of the permanent magnet. In order to accurately measure a temperature of a permanent magnet included in a rotor of the motor, a separate sensor and communication module are required, resulting in an increase in prices of the motor and an inverter, and thus a problem that the price competitiveness of a product is degraded occurs.

There are mainly three methods proposed to solve this problem: a method of assuming that a temperature of a stator coil and a temperature of a permanent magnet of a rotor are the same (hereinafter referred to as "first method"), a method of estimating a temperature of a permanent of a rotor by generating a three-dimensional magnetic flux map for a speed, torque, and temperature of the rotor of a motor (hereinafter referred to as "second method"), and a method of estimating a temperature of a permanent magnet using a thermal resistance of a motor and the characteristics of a cooling system (hereinafter referred to as "third method").

The first method among the above methods has a problem of low torque control precision because it is not based on the temperature of the permanent magnet of the rotor of the motor.

The second method has a problem that a temperature estimation error increases according to a change in battery voltage (or a direct-current high voltage) because it does not consider a magnetic flux change according to a voltage change in a high-voltage battery. In order to consider a change in battery voltage, a four-dimensional magnetic flux map should be generated or three or more sets of three-dimensional magnetic flux maps should be generated, which has a problem that many CPU memories are occupied and it takes much time to develop the magnetic flux map.

The third method may have the performance of the cooling system that changes according to a vehicle driving environment. When the performance of the cooling system changes, thermal resistances of a rotor and a stator of the motor varies depending on a flow rate of a cooling medium. In order to solve this problem, it is necessary to identify the heating amount of the motor and model copper and iron losses of the stator according to a torque and a speed, and there is a problem that a development time is excessively required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a system for estimating a temperature of a permanent magnet of a rotor of a motor including a first determination unit configured to determine whether a rotational speed of the rotor is greater than or equal to a reference speed, a second determination unit configured to determine a first condition, the first condition being whether a current flowing in a coil included in the motor is less than a reference current, and a second condition, the second condition being whether a magnitude of q-axis energy of the motor is less than a reference energy magnitude, when the rotational speed is greater than or equal to the reference speed, a magnetic flux map temperature estimation unit configured to estimate the temperature of the permanent magnet included in the rotor using a d-axis magnetic flux map of the motor responsive to one or more of the first condition and the second condition is satisfied in the second determination unit, and an energy map temperature estimation unit configured to estimate the temperature of the permanent magnet using a q-axis energy map of the motor responsive to one or more of the first condition and the second condition not being satisfied in the second determination unit.

The magnetic flux map temperature estimation unit may include a first storage unit configured to store data on a d-axis current, q-axis current, and d-axis magnetic flux flowing in the coil of the motor for each temperature acquired through a previously performed test, a second storage unit configured to process the data stored in the first storage unit using a first-order equation of the d-axis magnetic flux to the temperature for each d-axis current and q-axis current, and to calculate data on a coefficient of a first-order term and a constant term for each d-axis current and q-axis current of the first-order equation, a first calculation unit configured to calculate a first corrected magnetic flux using the data stored in the second storage unit and an equation below, and a second calculation unit configured to remove errors from the first corrected magnetic flux and to calculate the estimated temperature of the permanent magnet, and when receiving a current command value of the motor, the first calculation unit inputs a coefficient of the first-order term and a constant term corresponding to the current command value and an estimated temperature of the permanent magnet estimated before by the second calculation unit among the data stored in the second storage unit into the equation, $$A_{d,Adj} = A_d T_{mag,Est} + B_d$$

in the equation, $A_{d,Adj}$ denotes the first corrected magnetic flux, $A_d$ denotes the coefficient of the first-order term, $B_d$ denotes the constant term, and $T_{mag,Est}$ denotes the estimated temperature of the permanent magnet estimated before by the second calculation unit.

The second calculation unit may include a reference magnetic flux generator configured to calculate a d-axis reference magnetic flux according to the current command value, a voltage command value, and an electric angular speed input into the motor, a first compensation value storage unit configured to store magnetic flux nonlinearity compensation value data for each DC input voltage, rotational speed, and torque of the motor and calculate a magnetic flux nonlinearity compensation value according to the DC input voltage, the rotational speed, and the torque of the motor, a first compensation applier configured to generate a second corrected magnetic flux by subtracting the magnetic flux nonlinearity compensation value from the d-axis reference magnetic flux and the first corrected magnetic flux, a first integral controller configured to receive and integrally control a value received from the first compensation applier, and a first temperature estimator configured to add a temperature measured value of the coil of the motor to an output of the first integral controller and to calculate the estimated temperature of the permanent magnet.

The second calculation unit further may include a first output value limiter configured to filter the estimated temperature of the permanent magnet from the first temperature estimator or calculate the estimated temperature of the permanent magnet by limiting a change rate of the estimated temperature of the permanent magnet.

A calculation of the magnetic flux nonlinearity compensation value data may include calculating a first d-axis magnetic flux according to the current command value, the voltage command value, and the electric angular speed input into the motor through a previously performed test, calculating a second d-axis magnetic flux by inputting an actually measured temperature of the permanent magnet into the first-order equation and inputting a coefficient of the first-order term and the constant term according to the d-axis current and q-axis current according to the current command value input into the motor and the actually measured temperature of the permanent magnet among the data stored in the second storage unit, and subtracting the second d-axis magnetic flux from the first d-axis magnetic flux.

The energy map temperature estimation unit may include a third storage unit in which data on a d-axis current, q-axis current, and q-axis energy flowing in the coil of the motor for each temperature from a previously performed test is stored, a fourth storage unit configured to process the data stored in the third storage unit using a second-order equation of the q-axis energy to the temperature for each d-axis current and q-axis current, and to generate and store data on a coefficient of a second-order term, a coefficient of a first-order term, and a constant term for each d-axis current and q-axis current of the second-order equation, a third calculation unit configured to calculate a first corrected energy value using the data stored in the fourth storage unit and an equation below, and a fourth calculation unit configured to remove errors from the first corrected energy value and then calculate the estimated temperature of the permanent magnet, and when receiving a current command value of the motor, the third calculation unit inputs a coefficient of the second-order term, a coefficient of the first-order term, and a constant term corresponding to the current command value and an estimated temperature of the permanent magnet estimated before by the fourth calculation unit among the data stored in the fourth storage unit into the equation, $$E_{q,Adj} = A_e T_{mag,Est}^2 + B_e T_{mag,Est} + C_e$$

and in the equation, $E_{q,Adj}$ denotes the first corrected energy, $A_e$ denotes the coefficient of the second-order term, $B_e$ denotes the coefficient of the first-order term, C denotes the constant term, and $T_{mag,Est}$ denotes the estimated temperature of the permanent magnet estimated before by the fourth calculation unit.

The fourth calculation unit may include a reference energy generator configured to calculate a q-axis reference energy according to the current command value, a voltage command value, and a speed input into the motor, a first compensation value storage configured to store energy nonlinearity compensation value data for each DC input voltage, rotational speed, and torque of the motor and calculate an energy nonlinearity compensation value according to the DC input voltage, the rotational speed, and the torque of the motor, a second compensation applier configured to generate second corrected energy by subtracting the energy nonlinearity compensation value from the q-axis reference energy and output the first corrected energy from the second corrected energy, a second integral controller configured to receive and integrally control an output value of the second compensation applier, and a second temperature estimator configured to add a temperature measured value of the coil of the motor to an output of the second integral controller and calculate the estimated temperature of the permanent magnet.

The fourth calculation unit further may include a second output value limiter configured to receive and filter the estimated temperature of the permanent magnet output from the second temperature estimator or to calculate the estimated temperature of the permanent magnet by limiting a change rate of the estimated temperature of the permanent magnet.

A calculation of the energy nonlinearity compensation value data may include calculating first q-axis energy according to the current command value, the voltage command value, and the electric angular speed input into the motor through a previously performed test, calculating second q-axis energy by inputting an actually measured temperature of the permanent magnet into the second-order equation and inputting a coefficient of the second-order term, a coefficient of the first-order term, and the constant term according to the d-axis current and q-axis current according to the current command value input into the motor and the actually measured temperature of the permanent magnet among the data stored in the fourth storage unit, and subtracting the second q-axis energy from the first q-axis energy.

The system may include a basic permanent magnet temperature estimator configured to calculate a temperature measured value of a stator coil of the motor as the estimated temperature of the permanent magnet when the rotational speed of the rotor included in the motor is lower than the reference speed.

In a general aspect, here is provided a temperature estimation apparatus including one or more processors configured to execute instructions and a memory storing the instructions, wherein execution of the instructions configures the one or more processors to determine whether a rotational speed of a rotor of a motor is greater than or equal to a reference speed, determine a first condition, the first condition being whether a current flowing in a coil of the motor is less than a reference current, and a second condition, the second condition being whether a magnitude of q-axis energy of the motor is less than a reference energy magnitude, when the rotational speed is greater than or equal to the reference speed, estimate a magnetic flux map of the temperature of a permanent magnet of the rotor using a d-axis magnetic flux map of the motor responsive to one or more of the first condition and the second condition being satisfied, and estimate an energy map of the temperature of the permanent magnet using a q-axis energy map of the motor responsive to one or more of the first condition and the second condition not being satisfied.

The estimation of the magnetic flux map may include storing first data on a d-axis current, q-axis current, and d-axis magnetic flux flowing in the coil of the motor for each temperature acquired through a previously performed test, processing the first data using a first-order equation of the d-axis magnetic flux to the temperature for each d-axis current and q-axis current, and to calculate second data on a coefficient of a first-order term and a constant term for each d-axis current and q-axis current of the first-order equation, calculating a first corrected magnetic flux using the second data and an equation below, and removing errors from the first corrected magnetic flux and to calculate the estimated temperature of the permanent magnet, and, when receiving a current command value of the motor, inputting a coefficient of the first-order term and a constant term corresponding to the current command value and an estimated temperature of the permanent magnet estimated from among the second data into the equation, $$A_{d,Adj} = A_d T_{mag,Est} + B_d$$

in the equation, $A_{d,Adj}$ denotes the first corrected magnetic flux, $A_d$ denotes the coefficient of the first-order term, $B_d$ denotes the constant term, and $T_{mag,Est}$ denotes the estimated temperature of the permanent magnet.

The processor may be further configured to calculate a d-axis reference magnetic flux according to the current command value, a voltage command value, and an electric angular speed input into the motor, store magnetic flux nonlinearity compensation value data for each DC input voltage, rotational speed, and torque of the motor and calculate a magnetic flux nonlinearity compensation value according to the DC input voltage, the rotational speed, and the torque of the motor, generate, via a first compensation applier, a second corrected magnetic flux by subtracting the magnetic flux nonlinearity compensation value from the d-axis reference magnetic flux and the first corrected magnetic flux, receive and integrally control a first value received from the first compensation applier, and add a temperature measured value of the coil of the motor to the first value and to calculate the estimated temperature of the permanent magnet.

The processor may be further configured to filter the estimated temperature of the permanent magnet from or calculate the estimated temperature of the permanent magnet by limiting a change rate of the estimated temperature of the permanent magnet.

A calculation of the magnetic flux nonlinearity compensation value data may include calculating a first d-axis magnetic flux according to the current command value, the voltage command value, and the electric angular speed input into the motor through a previously performed test, calculating a second d-axis magnetic flux by inputting an actually measured temperature of the permanent magnet into the first-order equation and inputting a coefficient of the first-order term and the constant term according to the d-axis current and q-axis current according to the current command value input into the motor and the actually measured temperature of the permanent magnet among the second data, and subtracting the second d-axis magnetic flux from the first d-axis magnetic flux.

The estimation of the energy map may include storing third data on a d-axis current, q-axis current, and q-axis energy flowing in the coil of the motor for each temperature from a previously performed test is stored, processing the third data using a second-order equation of the q-axis energy to the temperature for each d-axis current and q-axis current, and to generate and store data on a coefficient of a second-order term, a coefficient of a first-order term, and a constant term for each d-axis current and q-axis current of the second-order equation, calculating a first corrected energy value using the fourth data and an equation below, and removing errors from the first corrected energy value and then calculate the estimated temperature of the permanent magnet, and, when receiving a current command value of the motor, inputting a coefficient of the second-order term, a coefficient of the first-order term, and a constant term corresponding to the current command value and an estimated temperature of the permanent magnet estimated before from among the fourth data into the equation, $$E_{q,Adj} = A_e T_{mag,Est}^2 + B_e T_{mag,Est} + C_e$$

and in the equation, $E_{q,Adj}$ denotes the first corrected energy, $A_e$ denotes the coefficient of the second-order term, $B_e$ denotes the coefficient of the first-order term, $C_e$ denotes the constant term, and $T_{mag,Est}$ denotes the estimated temperature of the permanent magnet.

The processor may be further configured to calculate a q-axis reference energy according to the current command value, a voltage command value, and a speed input into the motor, store energy nonlinearity compensation value data for each DC input voltage, rotational speed, and torque of the motor and calculate an energy nonlinearity compensation value according to the DC input voltage, the rotational speed, and the torque of the motor, generate, via a second compensation applier, second corrected energy by subtracting the energy nonlinearity compensation value from the q-axis reference energy and output the first corrected energy from the second corrected energy, receive and integrally control a second output value of the second compensation applier, and add a temperature measured value of the coil of the motor to the second output value and calculate the estimated temperature of the permanent magnet.

The removing the errors from the first corrected energy may include filtering the estimated temperature of the permanent magnet or to calculate the estimated temperature of the permanent magnet by limiting a change rate of the estimated temperature of the permanent magnet.

A calculation of the energy nonlinearity compensation value data may include calculating first q-axis energy according to the current command value, the voltage command value, and the electric angular speed input into the motor through a previously performed test, calculating second q-axis energy by inputting an actually measured temperature of the permanent magnet into the second-order equation and inputting a coefficient of the second-order term, a coefficient of the first-order term, and the constant term according to the d-axis current and q-axis current according to the current command value input into the motor and the actually measured temperature of the permanent magnet among the fourth data, and subtracting the second q-axis energy from the first q-axis energy.

The processor may be further configured to calculate a temperature measured value of a stator coil of the motor as the estimated temperature of the permanent magnet when the rotational speed of the rotor included in the motor is lower than the reference speed.

Figure 1:
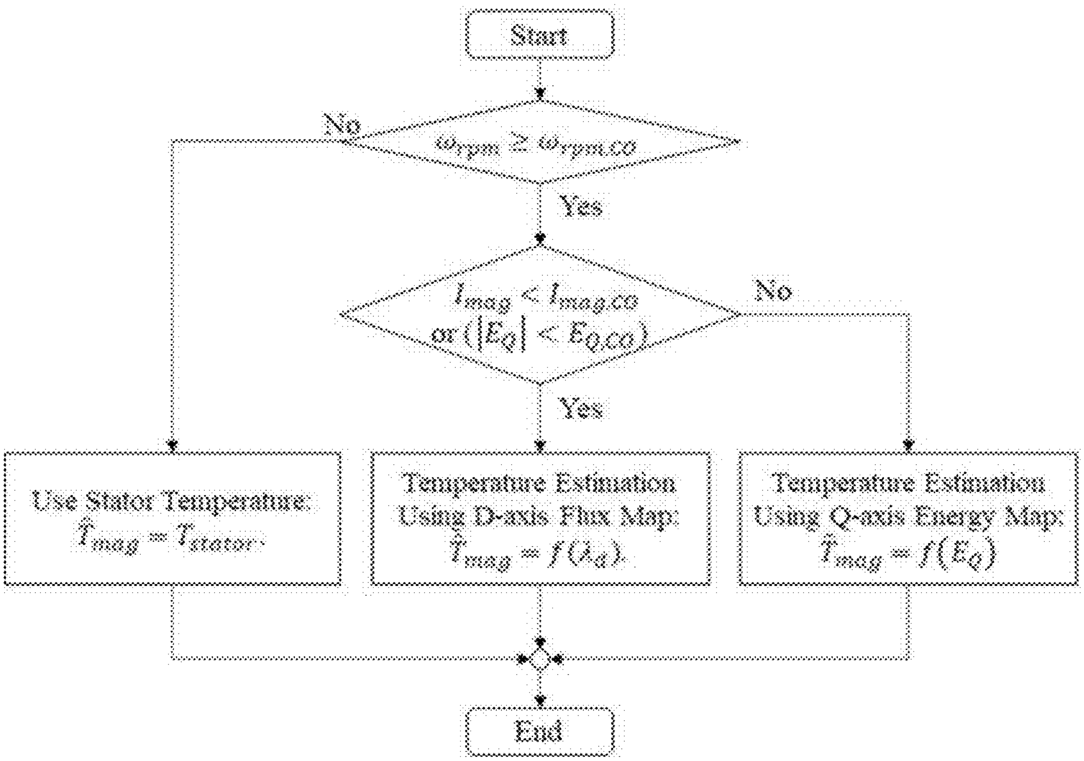
FIG. 1 is a flowchart of a system for estimating a temperature of a permanent magnet of a rotor of a motor according to a first embodiment of the present invention.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

FIG. 1 is a flowchart of a system for estimating a temperature of a permanent magnet of a rotor of a motor according to a first embodiment of the present invention.

As illustrated in FIG. 1, the system for estimating the temperature of the permanent magnet according to the first embodiment of the present invention first determines whether a rotational speed of the rotor included in the motor is greater than or equal to a reference speed. As illustrated in FIG. 1, $\omega_{rpm}$ denotes the rotational speed of the rotor, and $\omega_{rpm,CO}$ denotes the reference speed. Comparison between magnitudes of $\omega_{rpm}$ and $\omega_{rpm,CO}$ in FIG. 1 is performed by a first determination unit (not illustrated) included in the present embodiment. To this end, the first determination unit may be implemented as an electronic element capable of calculation or device including the electronic element and may receive rotational speed command value information of the motor from a control device (e.g., an inverter) of the motor. Components to be described below other than the first determination unit may be implemented as the electronic element capable of calculation or device including the electronic element.

When $\omega_{rpm}$ is smaller than $\omega_{rpm,CO}$ in the first determination unit, in the present invention, it is determined that the temperature of the permanent magnet of the rotor included in the motor is the same as a temperature of a stator of the motor or temperature of a stator coil, and an estimation temperature of the permanent magnet is output by a permanent magnet temperature estimation unit (not illustrated) under a condition of $\omega_{rpm}<\omega_{rpm,CO}$.

When a condition of $\omega_{rpm}\geq\omega_{rpm,CO}$ is satisfied in the first determination unit, a second determination unit (not illustrated) included in the present embodiment determines whether a current flowing in a coil is smaller than a reference current and whether a magnitude of q-axis energy of the motor is smaller than reference energy. A current comparison is referred to as a first condition, and a magnitude comparison of the energy is referred to a second condition, in which the first condition can be expressed as $I_{mag}<I_{mag,CO}$, and the second condition can be expressed as $|E_Q|<E_{Q,CO}$. In this case, $I_{mag}$ denotes the current flowing in the coil, $I_{mag,CO}$ denotes the reference current, $E_Q$ denotes the q-axis energy, and $E_{Q,CO}$ denotes the reference energy. A subscript CO in $E_{Q,CO}$ means change over, meaning that it serves as a reference for converting a method of estimating the temperature of the permanent magnet. The reference energy may be q-axis reference energy. In the present embodiment, the reference current $I_{mag,CO}$ used as the first condition may be $$\left(\frac{2}{1000}\right)\times\frac{V_{qs}}{R_s}$$

denotes a q-axis voltage, and $R_s$ denotes a stator resistance), and Neo used in the second condition may be 0.5 joule. However, the present invention does not limit $I_{mag,CO}$ and $E_{Q,CO}$ to the above specific values, and $I_{mag,CO}$ and $E_{Q,CO}$ may be changed as needed.

In the present embodiment, when at least one of the first condition and the second condition is satisfied in the second determination unit, an estimated temperature of the permanent magnet is output through a magnetic flux map temperature estimation unit, and when both the first condition and the second condition are not satisfied, in the present embodiment, the temperature of the permanent magnet is estimated and output through an energy map temperature estimation unit. This is to increase the accuracy of the estimated temperature of the permanent magnet, and since there is a disadvantage in that a method using a magnetic flux map has a large influence of a resistance change when a current increases, and there is a disadvantage in that a method using an energy map may not be used for temperature estimation when a current is zero, it is possible to increase accuracy by selecting any one of the two methods according to situations and estimating the temperature of the permanent magnet.

Hereinafter, a detailed method of estimating the temperature of the permanent magnet by the magnetic flux map temperature estimation unit among the magnetic flux map temperature estimation unit and the energy map temperature estimation unit will be first described.

Figure 2:
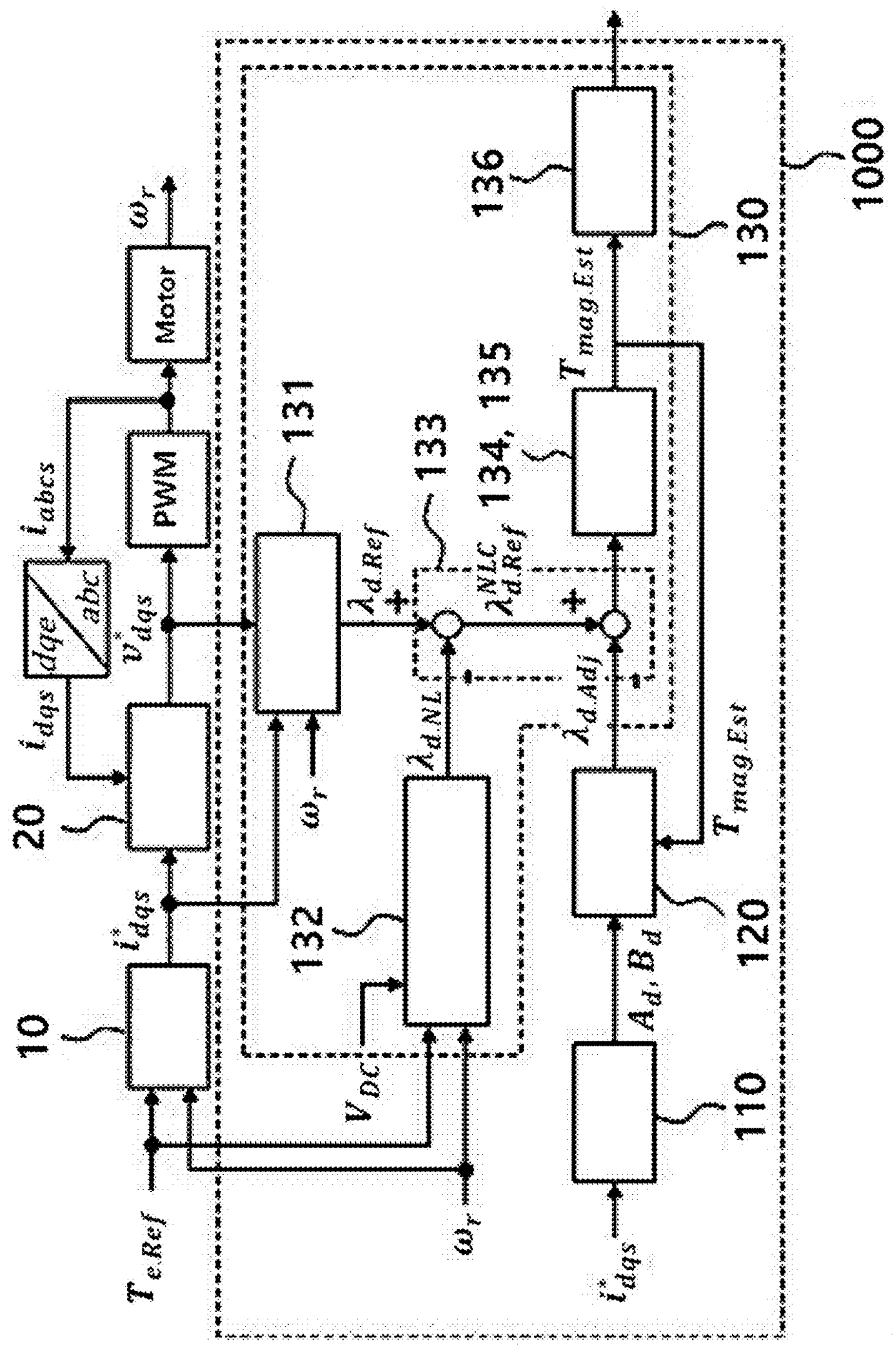
FIG. 2 is a block diagram of a magnetic flux map temperature estimation unit of the system for estimating the temperature of the permanent magnet of the rotor of the motor according to the first embodiment of the present invention.
Figure 3:
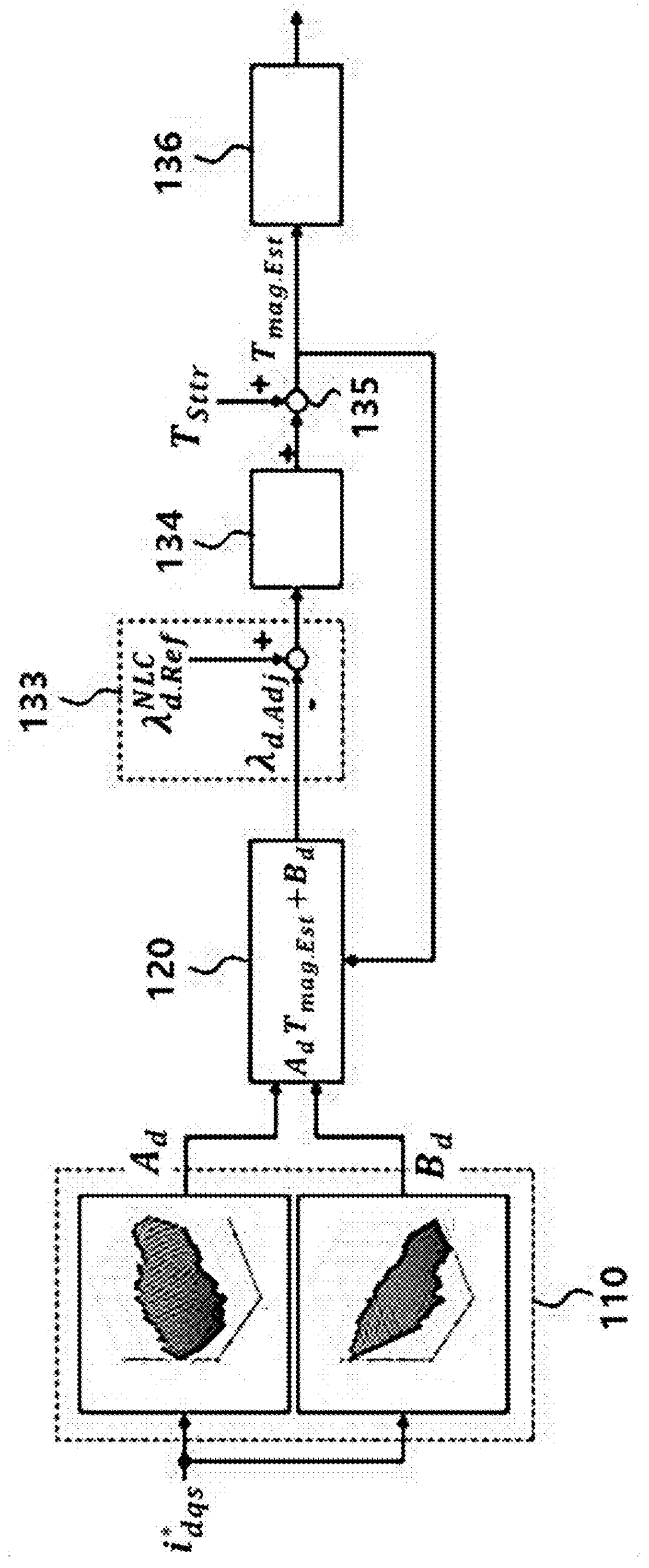
FIG. 3 is a detailed block diagram of the magnetic flux map temperature estimation unit of the system for estimating the temperature of the permanent magnet of the rotor of the motor according to the first embodiment of the present invention.

FIG. 2 is a block diagram of a magnetic flux map temperature estimation unit of the system for estimating the temperature of the permanent magnet of the rotor of the motor according to the first embodiment of the present invention, and FIG. 3 is a detailed block diagram of the magnetic flux map temperature estimation unit of the system for estimating the temperature of the permanent magnet of the rotor of the motor according to the first embodiment of the present invention.

As illustrated in FIGS. 2 and 3, a magnetic flux map temperature estimation unit 1000 of the system of estimating the temperature of the permanent magnet of the rotor of the motor according to the first embodiment of the present invention includes a 1-1 storage unit (not illustrated), a 1-2 storage unit 110, a 1-1 calculation unit 120, and a 1-2 calculation unit 130.

The 1-1 storage unit stores data of a d-axis current, q-axis current, and d-axis magnetic flux flowing in the coil of the motor for each temperature acquired through a previously performed test.

The previously performed test for generating the data stored in the 1-1 storage unit will be described. First, the d-axis magnetic flux at this time while changing the temperature, the d-axis current, and the q-axis current is calculated. The calculated d-axis magnetic flux may be calculated using an equation below.

$$\lambda_d=\frac{V_{qs}-R_sI_{qs}}{\omega_r}$$

In the above equation, $\lambda_d$ denotes the d-axis magnetic flux, $V_{qs}$ denotes the q-axis voltage, $R_s$ denotes the stator resistance, $I_{qs}$ denotes the q-axis current, and $\omega_r$ denotes an electric angular speed (rad/s). When the test is performed using the above equation, magnetic flux data sets according to the d-axis current, q-axis current, and temperature are acquired.

When the d-axis current and q-axis current are fixed by processing the data stored in the 1-1 storage unit, the 1-2 storage unit 110 processes the data using a first-order equation of the d-axis magnetic flux to the temperature. When the d-axis current and q-axis current are fixed, the d-axis magnetic flux and temperature may have the linear relationship of the first-order equation, and the 1-2 storage units 110 may acquire data on a coefficient of a first-order term and a constant term in the first-order equation for each d-axis current and q-axis current. The coefficient of the first-order term of the first-order equation for each d-axis current and q-axis current can be expressed as $A_d$, and the constant term can be expressed as $B_d$.

When receiving a current command value in controlling the motor, the 1-1 calculation unit 120 outputs a first corrected magnetic flux using the data stored in the 1-2 storage unit 110 and an equation below.

$$\lambda_{d,Adj}=A_dT_{mag,Est}+B_d$$

(In the above equation, $\lambda_{d,Adj}$ denotes the first corrected magnetic flux, $A_d$ denotes the coefficient of the first-order term, $B_d$ denotes the constant term, and $T_{mag,Est}$ denotes the estimated temperature of the permanent magnet estimated immediately before by the 1-2 calculation unit).

More specifically, when $$i^{\circ}_{dqs},$$

which is the current command value used in controlling the motor, is input into the 1-2 storage unit 110, the 1-1 calculation unit 120 calculates and outputs the first corrected magnetic flux $\lambda_{d,Adj}$ by applying the current command values $$i^{*}_{ds} \text{ and } i^{*}_{qz}$$

and $A_d$ and $B_d$ corresponding to the temperature corresponding to $T_{mag,Est}$ output from the 1-2 calculation unit 130 among the data stored in the 1-2 storage unit 110 to the above equation and applying $T_{mag,Est}$ to the above equation.

$T_{mag,Est}$ used in the above equation denotes the estimated temperature of the permanent magnet estimated immediately before by the 1-2 calculation unit 130. This means that in the present invention, the magnetic flux map temperature estimation unit 1000 repeatedly outputs the estimated temperature of the permanent magnet.

The 1-2 calculation unit 130 is operated by using a signal output from the 1-1 calculation unit 120. Since the 1-1 calculation unit 120 uses an output signal of the 1-2 calculation unit 130, the 1-1 calculation unit 120 may be controlled in a closed loop.

The inverter has nonlinearity. Since the nonlinearity of the inverter causes a drop in a voltage and an ON/OFF switching delay of a power semiconductor and changes in magnetic flux and energy caused by a voltage change due to a dead time, the nonlinearity causes errors in estimating the temperature of the permanent magnet. In order to solve this problem, the 1-2 calculation unit 130 removes the errors from the first corrected magnetic flux.

For the above operation, the 1-2 calculation unit 130 includes a reference magnetic flux generator 131, a first compensation value storage 132, a first compensation applier 133, and a first integral controller 134 and a first temperature estimator 135.

The reference magnetic flux generator 131 receives the current command value, voltage command value (DC input voltage), and electric angular speed input into the motor and calculates a d-axis reference magnetic flux. In this case, the current command value can be expressed as $$i^{*}_{dqs},$$

the voltage command value can be expressed as $$v^{*}_{dqz},$$

the electric angular speed can be expressed as $\omega_r$, and the d-axis reference magnetic flux can be expressed as $\lambda_{d,Ref}$.

The first compensation value storage 132 stores magnetic flux nonlinearity compensation value data for each DC input voltage, rotational speed, and torque of the motor. The DC input voltage can be expressed as $$v^{*}_{dqs}$$

or $V_{dc}$, the rotational speed can be expressed as $\omega_{rpm}$, and the torque can be expressed as $$T^{*}_{e}.$$

when the reference magnetic flux generator 131 receives $$v^{*}_{dqs}$$

or $V_{dc}$, $\omega_{rpm}$, and $$T^{*}_{e},$$

the first compensation value storage 132 outputs a magnetic flux compensation value corresponding to the input $$v^{*}_{dqs}$$

or $V_{dc}$, $\omega_{rpm}$, and $$T^{*}_{e}$$

among the data stored therein. In this case, the output magnetic flux nonlinearity compensation value is denoted by $\lambda_{d,NL}$.

The first compensation applier 133 subtracts $\lambda_{d,NL}$ from $\lambda_{d,Ref}$ and outputs a second corrected magnetic $$flux\ \lambda^{NLC}_{d,Ref}.$$

The first compensation applier 133 subtracts $\lambda_{d,Adj}$, which is the first corrected magnetic flux output from the 1-1 calculation unit 120, from the second corrected magnetic flux $$\lambda^{NLC}_{d,Ref}$$

and outputs $$\lambda^{NLC}_{d,Ref} - \lambda_{d,Adj}.$$

The first integral controller 134 integrally controls $$\lambda_{d,Ref}^{NLC} - \lambda_{d,Adj}$$

output from the first compensation applier 133. The first integral controller sets a bandwidth of a closed-loop system to about a predetermined Hz. The bandwidth set by the first integral controller 134 may be set in consideration of a change rate of the temperature of the permanent magnet of the rotor.

The first temperature estimator 135 adds a temperature measured value of the coil of the motor to the output of the first integral controller 134 and outputs the estimated temperature of the permanent magnet. The temperature measured value of the coil of the motor can be expressed as $T_{Sttr}$, and the estimated temperature of the permanent magnet output from the first temperature estimator 135 can be expressed as $T_{mag,Est}$. $T_{mag,Est}$ output from the first temperature estimator 135 may be output toward the 1-1 calculation unit 120 included in the magnetic flux map temperature estimation unit 1000.

As illustrated in FIGS. 2 and 3, the 1-2 calculation unit 130 may further include a first output value limiter 136.

In the field of signal engineering, a low-pass filter and SR limiter are devices or circuits for limiting a speed (slew rate (SR)) at which a signal may change over time. In other words, the first output value limiter 136 serves to prevent distortion or other unwanted effects in the signal by preventing the input $T_{mag,Est}$ from exceeding a specific maximum change rate. The low-pass filter or SR limiter can be implemented in a method such as a diode or RC circuit.

The magnetic flux nonlinearity compensation value data stored in the first compensation value storage 132 will be described.

Figure 4:
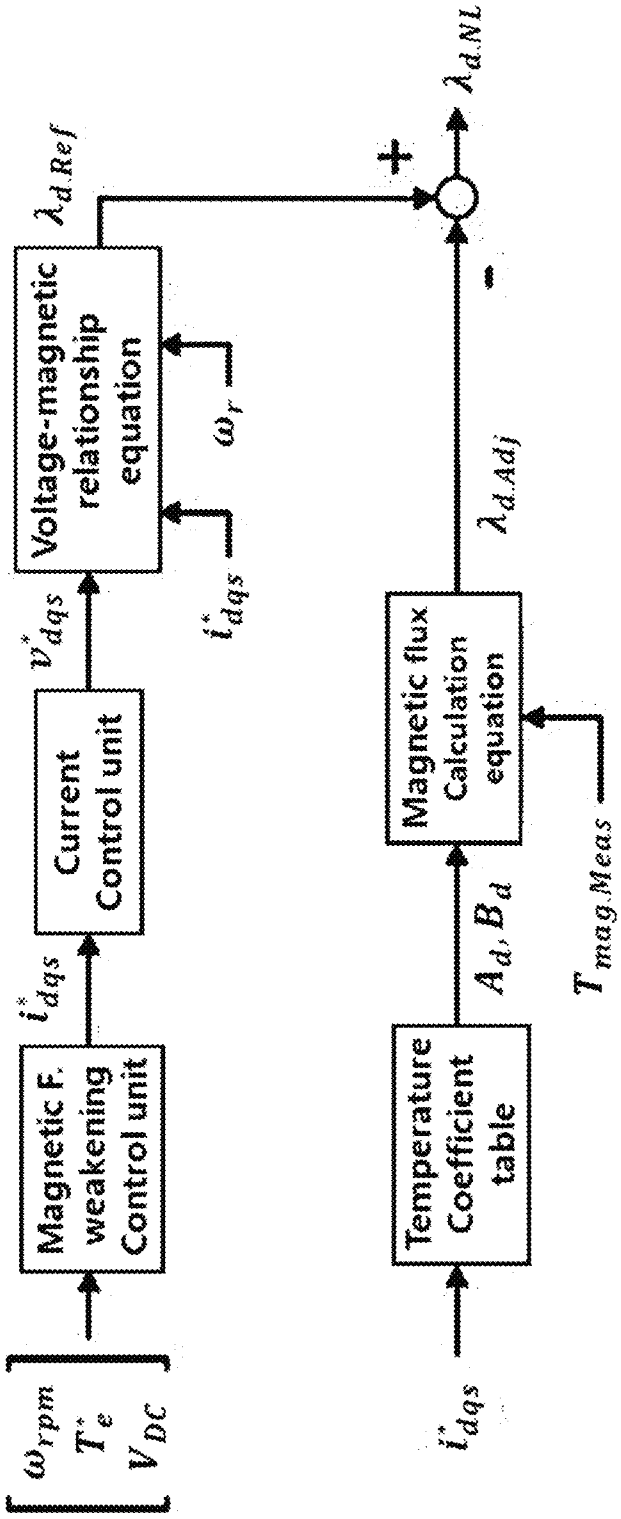
FIG. 4 is a block diagram of a process of generating magnetic flux nonlinearity compensation value data of the system for estimating the temperature of the permanent magnet of the rotor of the motor according to the first embodiment of the present invention.

FIG. 4 is a block diagram of a process of generating magnetic flux nonlinearity compensation value data of the system for estimating the temperature of the permanent magnet of the rotor of the motor according to the first embodiment of the present invention.

The magnetic flux nonlinearity compensation value data may be obtained through the previously performed test, that is, a test performed offline. More specifically, as illustrated in FIG. 4, the magnetic flux nonlinearity compensation value data are generated by calculating a first d-axis magnetic flux according to the current command value $$i_{dqs}^{*},$$

voltage command value $$v_{dqs}^{*},$$

and electric angular speed $\omega_r$ input into the motor, and current command magnetic flux nonlinearity compensation value data input into the motor among the data stored in the 1-2 storage unit 110 may be obtained through the previously tested test, that is, the test performed offline. More specifically, as illustrated in FIG. 4, the magnetic flux nonlinearity compensation value data are generated by calculating the first d-axis magnetic flux according to the current command value $$i_{dqs}^{*},$$

voltage command value $$v_{dqs}^{*},$$

and electric angular speed $\omega_r$ input into the motor, and calculating a second d-axis magnetic flux by inputting a coefficient of the first-order term and constant term corresponding to the current command value $$i_{dqs}^{*}$$

input into the motor and $T_{mag,Meas}$, which is an actually measured temperature of the permanent magnet, into the first-order equation among the data stored in the 1-2 storage unit 110. Although the first d-axis magnetic flux and second d-axis magnetic flux calculated when the magnetic flux nonlinearity compensation value data is generated differ from the above-described d-axis reference magnetic flux and first corrected magnetic flux, the method of calculating each is the same, and thus the first d-axis magnetic flux is expressed as $\lambda_{d,Ref}$ and the second d-axis magnetic flux is expressed as $\lambda_{d,Adj}$. $T_{mag,Meas}$, which is the actually measured temperature of the permanent magnet, may be any one of the temperature information stored in the 1-2 storage unit 110. Then, the magnetic flux nonlinearity compensation value data Adare generated by subtracting the second d-axis magnetic flux from the first d-axis magnetic flux. As illustrated in FIG. 4, in order to calculate the first d-axis magnetic flux, the input current command value $$i_{dqs}^{*}$$

is generated by being converted by a magnetic flux weakening control unit 10 receiving $$T_e^{*},$$

which is a torque command value of the motor, the DC voltage $V_{dc}$, and the rotational speed $\omega_{rpm}$. Therefore, the magnetic flux nonlinearity compensation value data may be obtained for each torque command value, DC voltage, and rotational speed. In the present embodiment, in the case of the DC voltage, the magnetic flux nonlinearity compensation value data for each voltage value is not acquired, but the nonlinearity compensation value data may be acquired at a minimum DC voltage $V_{DC\_min}$, a maximum DC voltage $V_{DC\_max}$, and middle DC voltage $V_{DC\_mid}$.

Hereinafter, an operation of an energy map temperature estimation unit 2000 will be described.

Figure 5:
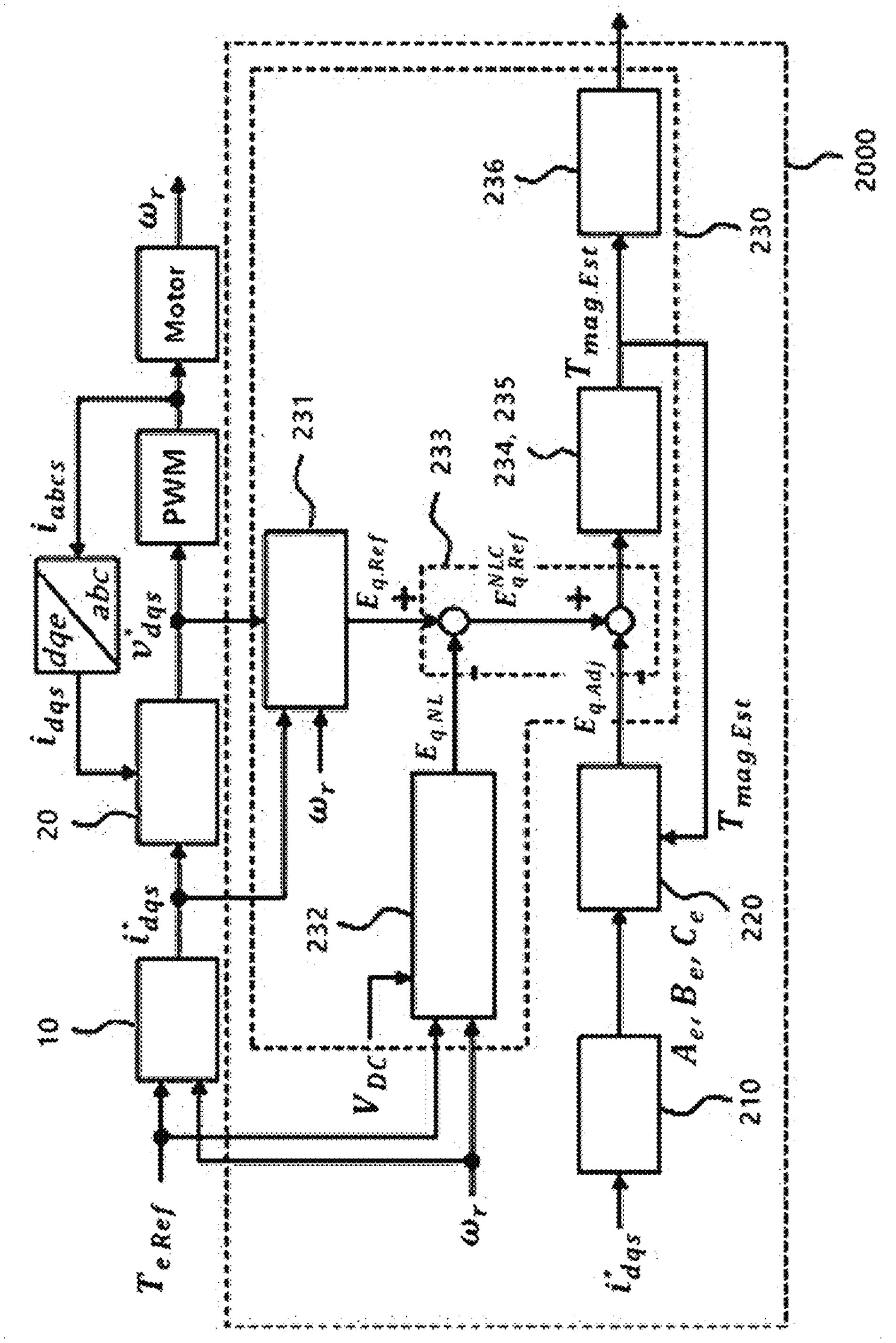
FIG. 5 is a block diagram of an energy map temperature estimation unit of the system for estimating the temperature of the permanent magnet of the rotor of the motor according to the first embodiment of the present invention.
Figure 6:
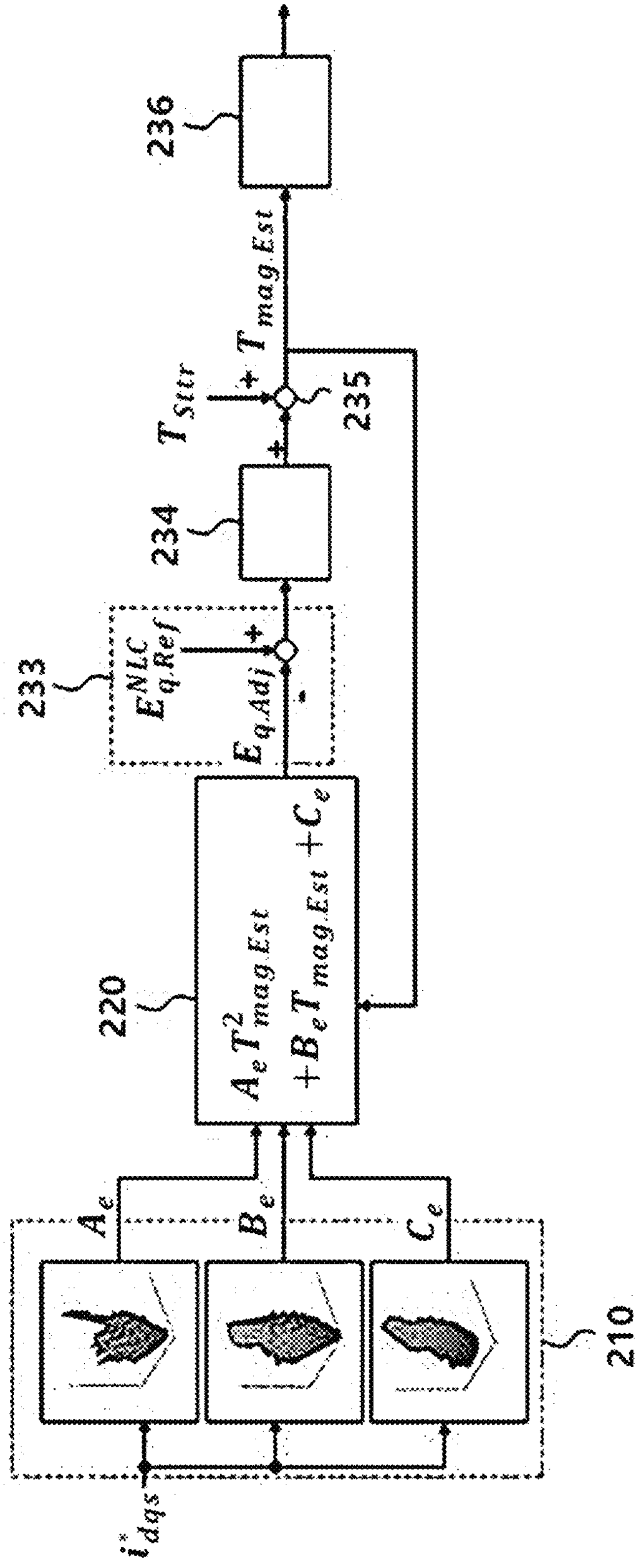
FIG. 6 is a detailed block diagram of the energy map temperature estimation unit of the system for estimating the temperature of the permanent magnet of the rotor of the motor according to the first embodiment of the present invention.

FIG. 5 is a block diagram of an energy map temperature estimation unit of the system for estimating the temperature of the permanent magnet of the rotor of the motor according to the first embodiment of the present invention, and FIG. 6 is a detailed block diagram of the energy map temperature estimation unit of the system for estimating the temperature of the permanent magnet of the rotor of the motor according to the first embodiment of the present invention.

As illustrated in FIGS. 5 and 6, the energy map temperature estimation unit 2000 of the system of estimating the temperature of the permanent magnet of the rotor of the motor according to the first embodiment of the present invention estimates the temperature of the permanent magnet using a q-axis energy map of the motor when any of the first condition and the second condition is not satisfied in the second determination unit. As illustrated in FIGS. 5 and 6, the energy map temperature estimation unit 2000 includes a 2-1 storage unit (not illustrated), a 2-2 storage unit 210, a 2-1 calculation unit 220, and a 2-2 calculation unit 230.

The 2-1 storage unit stores data of a d-axis current, q-axis current, and q-axis energy flowing in the coil of the motor for each temperature acquired through a previously performed test.

The previously performed test for generating the data stored in the 2-1 storage unit will be described. First, the q-axis energy at this time while changing the temperature, the d-axis current, and the q-axis current is calculated. The q-axis energy may be calculated using an equation below.

$$E_q = \frac{V_{qs}I_{ds} - V_{ds}I_{qs}}{\omega_r}$$

In the above equation, $E_q$ denotes the q-axis energy, $V_{qs}$ denotes the q-axis voltage, $R_s$ denotes the stator resistance, $I_{qs}$ denotes the q-axis current, and $\omega_r$ denotes an electric angular speed (rad/s). When the test is performed using the above equation, data sets of the q-axis energy according to the d-axis current, q-axis current, and temperature are acquired.

When the d-axis current and q-axis current are fixed by processing the data stored in the 2-1 storage unit, the 2-2 storage unit 210 processes the data using a second-order equation of the q-axis energy to the temperature. When the d-axis current and q-axis current are fixed, the q-axis energy and temperature may have the linear relationship of the second-order equation, and the 2-2 storage units 210 may acquire data on a coefficient of a second-order term, a coefficient of a first-order term, and a constant term in the second-order equation for each d-axis current and q-axis current. The coefficient of the second-order term of the second-order equation for each d-axis current and q-axis current can be expressed as $A_e$, the coefficient of the first-order term can be expressed as $B_e$, and the coefficient of the constant term can be expressed as $C_e$.

The 2-1 calculation unit 220 outputs first corrected energy using the data stored in the 2-2 storage unit 210 and an equation below.

$$E_{q,Adj} = A_e T_{mag,Est}^2 + B_e T_{mag,Est} + C_e$$

(In the above equation, $E_{q,Adj}$ denotes the first corrected energy, $A_e$ denotes the coefficient of the second-order term, $B_e$ denotes the coefficient of the first-order term, $C_e$ denotes the constant term, and $T_{mag,Est}$ denotes the estimated temperature of the permanent magnet estimated immediately before by the 2-2 calculation unit).

$T_{mag,Est}$ used in the above equation denotes the estimated temperature of the permanent magnet estimated immediately before by the 2-2 calculation unit 230. This means that in the present invention, the energy map temperature estimation unit 2000 repeatedly outputs the estimated temperature of the permanent magnet.

The 2-2 calculation unit 230 is operated by using a signal output from the 2-1 calculation unit 220. Since the 2-1 calculation unit 220 uses an output signal of the 2-2 calculation unit 230, the 2-1 calculation unit 220 may be controlled in a closed loop.

Like the above description of the magnetic flux map temperature estimation unit 1000, errors are included in the first corrected energy output from the 2-1 calculation unit 220. The 2-2 calculation unit 230 removes the errors from the first corrected energy output from the 2-1 calculation unit 220.

For the above operation, the 2-2 calculation unit 230 includes a reference energy generator 231, a second compensation value storage 232, a second compensation applier 233, and a second integral controller 234 and a second temperature estimator 235.

The reference energy generator 231 receives the current command value, voltage command value, and electric angular speed input into the motor and calculates q-axis reference energy. In this case, the current command value can be expressed as $$i_{dqs}^*,$$

the voltage command value can be expressed as $$v_{dqs}^*,$$

the speed can be expressed as $\omega_r$, and the q-axis reference energy can be expressed as $E_{q,Ref}$.

The second compensation value storage 232 stores energy nonlinearity compensation value data for each DC input voltage, rotational speed, and torque of the motor. The DC input voltage can be expressed as $V_{dc}$, the rotational speed can be expressed as $\omega_{rpm}$, and the torque can be expressed as $$T_e^*.$$

When receiving $V_{dc}$, $\omega_{rpm}$, and $$T_e^*,$$

the second compensation value storage 232 outputs energy nonlinearity compensation value corresponding to the input $V_{dc}$, $\omega_{rpm}$, and $$T_e^*$$

among the data stored therein. In this case, the energy nonlinearity compensation value is $E_{q,NL}$.

The second compensation applier 233 subtracts $E_{q,NL}$ from $E_{q,Ref}$ and outputs a second corrected magnetic flux $$E_{q,Ref}^{NLC}.$$

The second compensation applier 233 subtracts $E_{q,Adj}$, which is the first corrected energy output from the energy map temperature estimation unit 2000, from the second corrected energy $$E_{q,Ref}^{NLC}$$

and outputs $$E_{q,Ref}^{NLC} - E_{q,Adj}.$$

The second integral controller 234 integrally controls $$E_{q,Ref}^{NLC} - E_{q,Adj}$$

output from the second compensation applier 233. The second integral controller sets a bandwidth of a closed-loop system to about a predetermined Hz. The bandwidth set by the second integral controller 234 may be set in consideration of a change rate of the temperature of the permanent magnet of the rotor.

The second temperature estimator 235 adds a temperature measured value of the coil of the motor to the output of the second integral controller 234 and outputs the estimated temperature of the permanent magnet. The temperature measured value of the coil of the motor can be expressed as $T_{Sttr}$, and the estimated temperature of the permanent magnet output from the second temperature estimator 235 can be expressed as $T_{mag,Est}$. $T_{mag,Est}$ output from the second temperature estimator 235 may be output toward the 2-1 calculation unit 220 included in the energy map temperature estimation unit 2000.

The 2-2 calculation unit 230 may further include a second output value limiter 236.

The second output value limiter 236 can be implemented as a low-pass filter (LPF) or SR limiter. In the field of signal engineering, a low-pass filter and SR limiter are devices or circuits for limiting a speed (slew rate (SR)) at which a signal may change over time. In other words, the second output value limiter 236 serves to prevent distortion or other unwanted effects in the signal by preventing the input $T_{mag,Est}$ from exceeding a specific maximum change rate. The low-pass filter or SR limiter can be implemented in a method such as a diode or RC circuit.

The energy nonlinearity compensation value data stored in the second compensation value storage 232 will be described.

Figure 7:
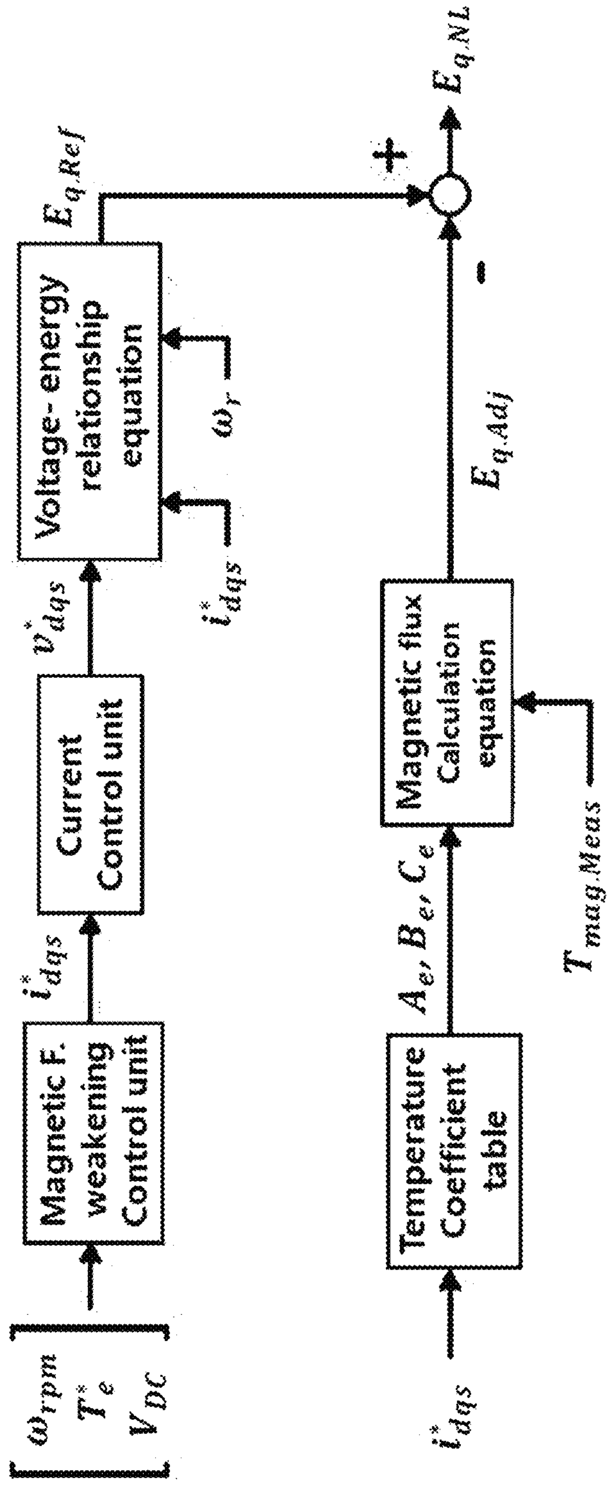
FIG. 7 is a block diagram of a process of generating energy nonlinearity compensation value data of the system for estimating the temperature of the permanent magnet of the rotor of the motor according to the first embodiment of the present invention.

FIG. 7 is a block diagram of a process of generating energy nonlinearity compensation value data of the system for estimating the temperature of the permanent magnet of the rotor of the motor according to the first embodiment of the present invention.

The energy nonlinearity compensation value data may be obtained through the previously tested test, that is, a test performed offline. More specifically, as illustrated in FIG. 7, the energy nonlinearity compensation value data is generated by calculating first d-axis energy according to the current command value $$i_{dqs}^{*},$$

voltage command value $$v_{dqs}^{*},$$

and electric angular speed $\omega_r$ input into the motor, and calculating second q-axis energy by inputting a coefficient of the second-order term, coefficient of the first-order term, and constant term corresponding to the current command value $$i_{dqs}^{*}$$

input into the motor and $T_{mag,Meas}$, which is an actually measured temperature of the permanent magnet, into the second-order equation. Although the first q-axis energy and second q-axis energy calculated when the energy nonlinearity compensation value data is generated differ from the above-described d-axis reference energy and first corrected energy, the method of calculating each is the same, and thus the first q-axis energy is expressed as $E_{q,Ref}$ and the second d-axis magnetic flux is expressed as $E_{q,Adj}$. $T_{mag,Meas}$, which is the actually measured temperature of the permanent magnet, may be any one of the temperature information stored in the 2-2 storage unit 210. Then, the energy nonlinearity compensation value data $E_{q,NL}$ are generated by subtracting the second q-axis energy from the first q-axis energy. As illustrated in FIG. 5, in order to calculate the first q-axis energy, the input current command value $$i_{dqs}^{*}$$

is generated by being converted by a magnetic flux weakening control unit 10 receiving $$T_e^{*},$$

which is a torque command value of the motor, the DC voltage $V_{dc}$, and the rotational speed $\omega_{rpm}$. Therefore, the energy nonlinearity compensation value data may be obtained for each torque command value, DC voltage, and rotational speed. In the present embodiment, in the case of the DC voltage, the magnetic flux nonlinearity compensation value data for each voltage value is not acquired, but the nonlinearity compensation value data may be acquired at a minimum DC voltage $V_{DC\_min}$ a maximum DC voltage $V_{DC\_max}$, and middle DC voltage $V_{DC\_mid}$.

The system for estimating the temperature of the permanent magnet of the rotor of the motor according to the present invention may be continuously performed during operation. In other words, the system does not end with estimating the temperature of the permanent magnet of the rotor once, but determines a condition in each of the first determination unit and the second determination unit and then estimates the temperature of the permanent magnet of the rotor in a different manner as the condition changes.

As described above, according to the present invention, by estimating the temperature of the permanent magnet using the temperature of the stator coil, estimating the temperature of the permanent magnet using the magnetic flux map, or estimating the temperature of the permanent magnet using the energy map according to the conditions, it is possible to increase the temperature estimation accuracy of the permanent magnet. When the system such as the system of the present invention is applied, it is possible to prevent the degradation in the performance of the motor by controlling the temperature of the permanent magnet to 180 to 200° C. or lower to prevent the permanent magnet from entering a high temperature at which irreversible demagnetization occurs. In addition, when this system is applied to electric vehicles, it is possible to increase driving distances of the electric vehicles by reducing a loss of a cooling system of the vehicle, and improve the efficiency of the entirety of the vehicle by reducing coolant or a flow rate of the coolant.

As described above, among the components included in the magnetic flux map temperature estimation unit 1000 and the energy map temperature estimation unit 2000, there are some functionally identical components. Describing this in pair, there are the first integral controller 134 and the second integral controller 234, the first temperature estimator 135 and the second temperature estimator 235, the first output value limiter 136, and the second output value limiter 236. As described above, the functionally identical components can be implemented as the same device. Among the above pairs, the first integral controller 134 and the second integral controller 234 are positioned at a frontmost end in a signal processing direction. When the first integral controller 134 and the second integral controller 234 are implemented as the same device and are referred to as the first integral controller 134, there may also be provided an embodiment in which a change-over switch is provided between the first integral controller 134 and the first compensation applier 133 and between the first integral controller 134 and the second compensation applier 233 to connect the first integral controller 134 to the first compensation applier 133 when the magnetic flux map temperature estimating method is used or connect the first integral controller 134 to the second compensation applier 233 when the energy map temperature estimating method is used.

According to the system for estimating the temperature of the permanent magnet of the rotor of the motor according to the present invention, by monitoring the temperature of the permanent magnet in real time, it is possible to prevent degradation the performance of the permanent magnet due to the high temperature and improve the output torque control precision and efficiency of the motor.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A system for estimating a temperature of a permanent magnet of a rotor of a motor, comprising:

a first determination unit configured to determine whether a rotational speed of the rotor is greater than or equal to a reference speed;

a second determination unit configured to, in response to determining that the rotational speed of the rotor is greater than or equal to the reference speed, determine a first condition, the first condition being whether a current flowing in a coil included in the motor is less than a reference current, and a second condition, the second condition being whether a magnitude of q-axis energy value of the motor is less than a reference energy magnitude, wherein the q-axis energy value is calculated based on a g-axis voltage, a stator resistance, a q-axis current, and an electric angular speed of the motor;

a magnetic flux map temperature estimation unit configured to estimate the temperature of the permanent magnet included in the rotor using a d-axis magnetic flux map of the motor when at least one of the first condition and the second condition is satisfied in the second determination unit; and an energy map temperature estimation unit configured to estimate the temperature of the permanent magnet using a q-axis energy map of the motor when neither the first condition nor the second condition is satisfied in the second determination unit.

2. The system of claim 1, wherein the magnetic flux map temperature estimation unit comprises:

a first storage unit configured to store data on a d-axis current, q-axis current, and d-axis magnetic flux flowing in the coil of the motor for each temperature acquired through a previously performed test;

a second storage unit configured to process the data stored in the first storage unit using a first-order equation of the d-axis magnetic flux to the temperature for each d-axis current and q-axis current, and to calculate data on a coefficient of a first-order term and a constant term for each d-axis current and q-axis current of the first-order equation;

a first calculation unit configured to calculate a first corrected magnetic flux using the data stored in the second storage unit and an equation below; and a second calculation unit configured to remove errors from the first corrected magnetic flux and to calculate the estimated temperature of the permanent magnet, and when receiving a current command value of the motor, the first calculation unit inputs a coefficient of the first-order term and a constant term corresponding to the current command value and an estimated temperature of the permanent magnet estimated before by the second calculation unit among the data stored in the second storage unit into the equation, $$A_{d,Adj} = A_d T_{mag,Est} + B_d$$

wherein, $A_{d,Adj}$ denotes the first corrected magnetic flux, $A_d$ denotes the coefficient of the first-order term, $B_d$ denotes the constant term, and mag $T_{mag,Est}$ denotes the estimated temperature of the permanent magnet estimated before by the second calculation unit.

3. The system of claim 2, wherein the second calculation unit comprises:

a reference magnetic flux generator configured to calculate a d-axis reference magnetic flux according to the current command value, a voltage command value, and an electric angular speed input into the motor;

a first compensation value storage unit configured to store magnetic flux nonlinearity compensation value data for each DC input voltage, rotational speed, and torque of the motor and calculate a magnetic flux nonlinearity compensation value according to the DC input voltage, the rotational speed, and the torque of the motor;

a first compensation applier configured to generate a second corrected magnetic flux by subtracting the magnetic flux nonlinearity compensation value from the d-axis reference magnetic flux and the first corrected magnetic flux;

a first integral controller configured to receive and integrally control a value received from the first compensation applier; and a first temperature estimator configured to add a temperature measured value of the coil of the motor to an output of the first integral controller and to calculate the estimated temperature of the permanent magnet.

4. The system of claim 3, wherein the second calculation unit further comprises a first output value limiter configured to filter the estimated temperature of the permanent magnet from the first temperature estimator or calculate the estimated temperature of the permanent magnet by limiting a change rate of the estimated temperature of the permanent magnet.

5. The system of claim 3, wherein a calculation of the magnetic flux nonlinearity compensation value data comprises:

calculating a first d-axis magnetic flux according to the current command value, the voltage command value, and the electric angular speed input into the motor through a previously performed test;

calculating a second d-axis magnetic flux by inputting an actually measured temperature of the permanent magnet into the first-order equation and inputting a coefficient of the first-order term and the constant term according to the d-axis current and q-axis current according to the current command value input into the motor and the actually measured temperature of the permanent magnet among the data stored in the second storage unit; and subtracting the second d-axis magnetic flux from the first d-axis magnetic flux.

6. The system of claim 1, wherein the energy map temperature estimation unit comprises:

a third storage unit in which data on a d-axis current, q-axis current, and q-axis energy flowing in the coil of the motor for each temperature from a previously performed test is stored;

a fourth storage unit configured to process the data stored in the third storage unit using a second-order equation of the q-axis energy to the temperature for each d-axis current and q-axis current, and to generate and store data on a coefficient of a second-order term, a coefficient of a first-order term, and a constant term for each d-axis current and q-axis current of the second-order equation;

a third calculation unit configured to calculate a first corrected energy value using the data stored in the fourth storage unit and an equation below;

a fourth calculation unit configured to remove errors from the first corrected energy value and then calculate the estimated temperature of the permanent magnet, and when receiving a current command value of the motor, the third calculation unit inputs a coefficient of the second-order term, a coefficient of the first-order term, and a constant term corresponding to the current command value and an estimated temperature of the permanent magnet estimated before by the fourth calculation unit among the data stored in the fourth storage unit into the equation, $$E_{q,Adj} = A_e T_{mag,Est}^2 + B_e T_{mag,Est} + C_e$$

wherein $E_{q,Adj}$ denotes the first corrected energy, $A_g$ denotes the coefficient of the second-order term, $B_e$ denotes the coefficient of the first-order term, $C_e$ denotes the constant term, and mas $T_{mag,Est}$ denotes the estimated temperature of the permanent magnet estimated before by the fourth calculation unit.

7. The system of claim 6, wherein the fourth calculation unit comprises:

a reference energy generator configured to calculate a q-axis reference energy according to the current command value, a voltage command value, and a speed input into the motor;

a first compensation value storage configured to store energy nonlinearity compensation value data for each DC input voltage, rotational speed, and torque of the motor and calculate an energy nonlinearity compensation value according to the DC input voltage, the rotational speed, and the torque of the motor;

a second compensation applier configured to generate second corrected energy by subtracting the energy nonlinearity compensation value from the q-axis reference energy and output the first corrected energy from the second corrected energy;

a second integral controller configured to receive and integrally control an output value of the second compensation applier; and a second temperature estimator configured to add a temperature measured value of the coil of the motor to an output of the second integral controller and calculate the estimated temperature of the permanent magnet.

8. The system of claim 7, wherein the fourth calculation unit further comprises a second output value limiter configured to receive and filter the estimated temperature of the permanent magnet output from the second temperature estimator or to calculate the estimated temperature of the permanent magnet by limiting a change rate of the estimated temperature of the permanent magnet.

9. The system of claim 7, wherein a calculation of the energy nonlinearity compensation value data comprises:

calculating first q-axis energy according to the current command value, the voltage command value, and the electric angular speed input into the motor through a previously performed test;

calculating second q-axis energy by inputting an actually measured temperature of the permanent magnet into the second-order equation and inputting a coefficient of the second-order term, a coefficient of the first-order term, and the constant term according to the d-axis current and q-axis current according to the current command value input into the motor and the actually measured temperature of the permanent magnet among the data stored in the fourth storage unit; and subtracting the second q-axis energy from the first q-axis energy.

10. The system of claim 1, comprising a basic permanent magnet temperature estimator configured to calculate a temperature measured value of a stator coil of the motor as the estimated temperature of the permanent magnet when the rotational speed of the rotor included in the motor is lower than the reference speed.

11. A temperature estimation apparatus, comprising:

one or more processors configured to execute instructions; and a memory storing the instructions, wherein execution of the instructions configures the one or more processors to:

determine whether a rotational speed of a rotor of a motor is greater than or equal to a reference speed;

in response to determining that the rotational speed of the rotor is greater than or equal to the reference speed, determine a first condition, the first condition being whether a current flowing in a coil of the motor is less than a reference current, and a second condition, the second condition being whether a magnitude of q-axis energy value of the motor is less than a reference energy magnitude, wherein the q-axis energy value is calculated based on a q-axis voltage, a stator resistance, a q-axis current, and an electric angular speed of the motor;

estimate the temperature of a permanent magnet of the rotor using a d-axis magnetic flux map of the motor when at least one of the first condition and the second condition is satisfied; and estimate the temperature of the permanent magnet using a q-axis energy map of the motor when neither the first condition and the second condition not being is satisfied.

12. The apparatus of claim 11, wherein the estimation of the magnetic flux map comprises:

storing first data on a d-axis current, q-axis current, and d-axis magnetic flux flowing in the coil of the motor for each temperature acquired through a previously performed test;

processing the first data using a first-order equation of the d-axis magnetic flux to the temperature for each d-axis current and q-axis current, and to calculate second data on a coefficient of a first-order term and a constant term for each d-axis current and q-axis current of the first-order equation;

calculating a first corrected magnetic flux using the second data and an equation below; and removing errors from the first corrected magnetic flux and to calculate the estimated temperature of the permanent magnet, and when receiving a current command value of the motor, inputting a coefficient of the first-order term and a constant term corresponding to the current command value and an estimated temperature of the permanent magnet estimated from among the second data into the equation, $$A_{d,Adj} = A_d T_{mag,Est} + B_d$$

wherein, $A_{C,Adj}$ denotes the first corrected magnetic flux, $A_d$ denotes the coefficient of the first-order term, $B_d$ denotes the constant term, and mag $T_{mag,Est}$ denotes the estimated temperature of the permanent magnet.

13. The apparatus of claim 12, wherein the processor is further configured to:

calculate a d-axis reference magnetic flux according to the current command value, a voltage command value, and an electric angular speed input into the motor;

store magnetic flux nonlinearity compensation value data for each DC input voltage, rotational speed, and torque of the motor and calculate a magnetic flux nonlinearity compensation value according to the DC input voltage, the rotational speed, and the torque of the motor;

generate, via a first compensation applier, a second corrected magnetic flux by subtracting the magnetic flux nonlinearity compensation value from the d-axis reference magnetic flux and the first corrected magnetic flux;

receive and integrally control a first value received from the first compensation applier; and add a temperature measured value of the coil of the motor to the first value and to calculate the estimated temperature of the permanent magnet.

14. The apparatus of claim 13, wherein the processor is further configured to:

filter the estimated temperature of the permanent magnet from or calculate the estimated temperature of the permanent magnet by limiting a change rate of the estimated temperature of the permanent magnet.

15. The apparatus of claim 13, wherein a calculation of the magnetic flux nonlinearity compensation value data comprises:

calculating a first d-axis magnetic flux according to the current command value, the voltage command value, and the electric angular speed input into the motor through a previously performed test;

calculating a second d-axis magnetic flux by inputting an actually measured temperature of the permanent magnet into the first-order equation and inputting a coefficient of the first-order term and the constant term according to the d-axis current and q-axis current according to the current command value input into the motor and the actually measured temperature of the permanent magnet among the second data; and subtracting the second d-axis magnetic flux from the first d-axis magnetic flux.

16. The system of claim 11, wherein the estimation of the energy map comprises:

storing third data on a d-axis current, q-axis current, and q-axis energy flowing in the coil of the motor for each temperature from a previously performed test is stored;

processing the third data using a second-order equation of the q-axis energy to the temperature for each d-axis current and q-axis current, and to generate and store data on a coefficient of a second-order term, a coefficient of a first-order term, and a constant term for each d-axis current and q-axis current of the second-order equation;

calculating a first corrected energy value using the fourth data and an equation below;

removing errors from the first corrected energy value and then calculate the estimated temperature of the permanent magnet, and when receiving a current command value of the motor, inputting a coefficient of the second-order term, a coefficient of the first-order term, and a constant term corresponding to the current command value and an estimated temperature of the permanent magnet estimated before from among the fourth data into the equation, $$E_{q,Adj} = A_e T^2_{mag,Est} + B_e T_{mag,Est} + C_e$$

wherein $E_{q,Adj}$ denotes the first corrected energy, $A_g$ denotes the coefficient of the second-order term, $B_e$ denotes the coefficient of the first-order term, denotes the constant term, and $T_{mag,Est}$ denotes the estimated temperature of the permanent magnet.

17. The apparatus of claim 16, wherein the processor is further configured to:

calculate a q-axis reference energy according to the current command value, a voltage command value, and a speed input into the motor;

store energy nonlinearity compensation value data for each DC input voltage, rotational speed, and torque of the motor and calculate an energy nonlinearity compensation value according to the DC input voltage, the rotational speed, and the torque of the motor;

generate, via a second compensation applier, second corrected energy by subtracting the energy nonlinearity compensation value from the q-axis reference energy and output the first corrected energy from the second corrected energy;

receive and integrally control a second output value of the second compensation applier; and add a temperature measured value of the coil of the motor to the second output value and calculate the estimated temperature of the permanent magnet.

18. The apparatus of claim 17, wherein the removing the errors from the first corrected energy comprises:

filtering the estimated temperature of the permanent magnet or to calculate the estimated temperature of the permanent magnet by limiting a change rate of the estimated temperature of the permanent magnet.

19. The apparatus of claim 17, wherein a calculation of the energy nonlinearity compensation value data comprises:

calculating first q-axis energy according to the current command value, the voltage command value, and the electric angular speed input into the motor through a previously performed test;

calculating second q-axis energy by inputting an actually measured temperature of the permanent magnet into the second-order equation and inputting a coefficient of the second-order term, a coefficient of the first-order term, and the constant term according to the d-axis current and q-axis current according to the current command value input into the motor and the actually measured temperature of the permanent magnet among the fourth data; and subtracting the second q-axis energy from the first q-axis energy.

20. The apparatus of claim 11, wherein the processor is further configured to:

Calculate a temperature measured value of a stator coil of the motor as the estimated temperature of the permanent magnet when the rotational speed of the rotor included in the motor is lower than the reference speed.

* * * * *